US007518382B2

(12) United States Patent
Vermesan et al.

(10) Patent No.: US 7,518,382 B2
(45) **Date of Patent: *Apr. 14, 2009**

(54) MINIATURE SENSOR CHIP, ESPECIALLY FOR FINGER PRINT SENSORS

(75) Inventors: Ovidiu Vermesan, Stabekk (NO); Jon Nysaether, Oslo (NO); Ib-Rune Johansen, Oslo (NO); Jon Tschudi, Oslo (NO)

(73) Assignee: Idex ASA, Fornebu (NO)

( * ) Notice: Subject to any disclaimer, the term of this patent is extended or adjusted under 35 U.S.C. 154(b) by 0 days.

This patent is subject to a terminal disclaimer.

(21) Appl. No.: 11/837,760

(22) Filed: Aug. 13, 2007

(65) Prior Publication Data

US 2008/0030207 A1 Feb. 7, 2008

Related U.S. Application Data

(63) Continuation of application No. 10/297,745, filed as application No. PCT/NO01/00239 on Jun. 8, 2001, now Pat. No. 7,283,651.

(30) Foreign Application Priority Data

Jun. 9, 2000 (NO) ................................. 20003003

(51) Int. Cl.
*G01R 27/26* (2006.01)
*G06K 9/00* (2006.01)

(52) U.S. Cl. ...................................... 324/687; 382/124

(58) Field of Classification Search ................ 324/687, 324/686, 658, 649, 600; 382/124, 126, 115, 382/312

See application file for complete search history.

(56) References Cited

U.S. PATENT DOCUMENTS

| | | | | |
|---|---|---|---|---|
| 5,371,404 | A | 12/1994 | Juskey et al. | |
| 5,399,898 | A | 3/1995 | Rostoker | |
| 5,862,248 | A | 1/1999 | Salatino et al. | |
| 5,963,679 | A | 10/1999 | Setlak | |
| 6,020,749 | A | 2/2000 | Morris et al. | |
| 6,026,564 | A | 2/2000 | Wang et al. | |
| 6,069,970 | A | 5/2000 | Salatino et al. | |
| 6,234,031 | B1 * | 5/2001 | Suga | 73/862.474 |

(Continued)

FOREIGN PATENT DOCUMENTS

EP 0902387 A2 3/1999

(Continued)

OTHER PUBLICATIONS

Balde et al., "Electronic Materials Handbook, ASM International, vol. 1, Packaging," pp. 144-145, 297-305, 320-321, 438-442 (ISBN 0-87170-285-1).

(Continued)

*Primary Examiner*—Diego Gutierrez
*Assistant Examiner*—Hoai-An D Nguyen
(74) *Attorney, Agent, or Firm*—Rothwell, Figg, Ernst & Manbeck, PC

(57) ABSTRACT

A sensor chip for measuring of structures in a finger surface includes an electronic chip provided with a number of sensor electrodes for capacitance measurements. The chip further includes a first layer comprising a metal or another electrically conducting material over and coupled to the sensor electrodes and a first dielectric layer substantially covering the first metal layer.

11 Claims, 2 Drawing Sheets

U.S. PATENT DOCUMENTS

| | | | | |
|---|---|---|---|---|
| 6,259,804 | B1 * | 7/2001 | Setlak et al. | 382/124 |
| 6,483,931 | B2 * | 11/2002 | Kalnitsky et al. | 382/124 |
| 6,785,407 | B1 | 8/2004 | Tschudi et al. | |
| 7,054,471 | B2 * | 5/2006 | Tschudi | 382/124 |
| 7,110,577 | B1 * | 9/2006 | Tschudi | 382/124 |
| 7,184,581 | B2 * | 2/2007 | Johansen et al. | 382/124 |
| 7,239,153 | B2 * | 7/2007 | Nysæther | 324/661 |
| 7,251,351 | B2 * | 7/2007 | Mathiassen et al. | 382/124 |
| 7,283,651 | B2 * | 10/2007 | Vermesan et al. | 382/124 |
| 2003/0161511 | A1 | 8/2003 | Vermesan et al. | |

FOREIGN PATENT DOCUMENTS

| | | | |
|---|---|---|---|
| EP | 0919947 | A2 | 6/1999 |
| WO | WO 98/58342 | A1 | 6/1998 |
| WO | WO 9852157 | A1 | 11/1998 |

OTHER PUBLICATIONS

Baumgartner A., et al. "Advanced Multichip Module Technologies," Proceedings of the 9th European Hybrid Microelectronic, pp. 200-207 (Jun. 1993).

Drueke, Klaus, "A Sealing Process for Printed-Through Holes," Proceedings of the 9th European Hybrid Microelectronics Conference, ISHM. International Society for Hybrid Microelectronic, pp. 115-122 (Jun. 1993).

PCT International Search Report of PCT/NO01/00239, 4 pages (Jan. 9, 2002).

Norwegian Search Report of NO 20003004, 2 pages (Feb. 7, 2001).

* cited by examiner

MINIATURE SENSOR CHIP, ESPECIALLY FOR FINGER PRINT SENSORS

CONTINUITY

This application is a continuation of U.S. application Ser. No. 10/297,745 filed Apr. 28, 2003, which is a 371 national phase of PCT/NO01/00239 filed Jun. 8, 2001, which claims priority to NO 20003003 filed Jun. 9, 2000, the respective disclosures of which are hereby incorporated by reference.

BACKGROUND AND SUMMARY

This invention relates to a sensor chip, especially for measuring structures in a finger surface.

Fingerprint sensors based on capacitive coupling of an AC signal from the groove pattern of the finger to an array (matrix) of sensor elements are known from international patent application No PCT/NO98/00182. U.S. Pat. No. 5,963,679 describes a similar sensor with a different measuring principle and a two dimensional sensor matrix.

For special applications, e.g. when being mounted in a cellular phone or a lap-top PC, it is important that the sensor is made as small and light as possible. Such a miniature sensor may also be very cost effective if production techniques suitable for mass production are used.

Noise considerations are important when positioning the electronic interrogation circuit, often a costumer specified silicon circuit ("ASIC") as close to the capacitance sensitive elements in the sensor array as possible, so that the length of the electrical conductors between the silicon circuit and the sensor elements is minimized.

The abovementioned requirements related to size and electronic functionality may be difficult to realize using standard packing techniques in which the silicon circuit is mounted in a plastic based or ceramic housing. At the same time as the housing effectively protects the sensor from the outer influences, such a solution may result in a sensor with relative large dimensions, while the housing "legs" gives an unsuitable interface to the finger.

In addition to these general problems it is strongly desirable to provide components adding extra functionality to the interface toward the user, to secure optimal signal quality. Thus it would be a great advantage if such components may be integrated into the sensor itself.

The object of this invention is to secure a cost effective and miniaturized sensor solution based on a naked silicon chip (ASIC) with a multi layer metallization having a surface defining the interface toward the user's fingers. The principle is based the fact that the array of imaging sensor elements is positioned in one of the upper metal layers on a silicon surface.

In a standard production process for ASICs, the silicon surface is provided with a number of metal layers with conductor leads, separated by thin dielectric layers. In addition there may be built a so called sandwich structure with extra layers of metal and dielectrics on top of the other layers. By laying the functional structures for detection of the finger's pattern in the upper layers of the ASIC, a miniature sensor as described above may be produced.

In U.S. Pat. Nos. 6,069,970; 5,862,248; and 5,963,679 fingerprint sensors are described being based on the abovementioned techniques. These solutions do, however, differ substantially in construction, so that the functions of each layer are different. These solutions relate to very complex two dimensional sensor structures in which the impedance is measured locally with drive electrodes for each pixel. This is, however, making strict requirements to the electronic circuitry in general.

The present invention relates to a simplified solution to the challenges described above.

Using a stimulation electrode in electrical contact with the finger an impedance measurement is obtained through the finger and the surface to a sensor electrode. This, in addition to the substantially linear sensor structure, thus provides a largely simplified sensor relative to the known solutions which is simple to produce and implement in small, mobile apparatuses.

Since the sensor thus may be produced using standard processes for IC production, this will give a very cost efficient sensor being suitable for mass production.

BRIEF DESCRIPTION OF THE DRAWINGS

The invention will be described below with reference to the enclosed drawings, illustrating the invention by way of example.

DETAILED DESCRIPTION

As is evident from the drawings the sensor chip according to the invention preferably consists of a naked silicon chip 6 in a housing 7 without a cover (or possibly on a circuit board or ceramic substrate) with a number of layers of metal or another electrically conductive material such as polysilicon, and a dielectric constituting the interface toward the user's fingers. The principle is based on imaging sensor elements constituting a part of the third or fourth upper layer of the electrically conductive layers 1 on the silicon circuit, and that the conductor lead, from the elements then is routed individually down to the amplifier circuits on the surface of the silicon chip.

The present solution may be produced industrially by standard methods for ASIC production and packing, as the silicon chip is mounted in a ceramic or plastic based housing without a lid, or on a circuit board or a ceramic substrate. The silicon chip is coupled electrically to the circuit board or housing with so called wire bonding.

Figure 1:
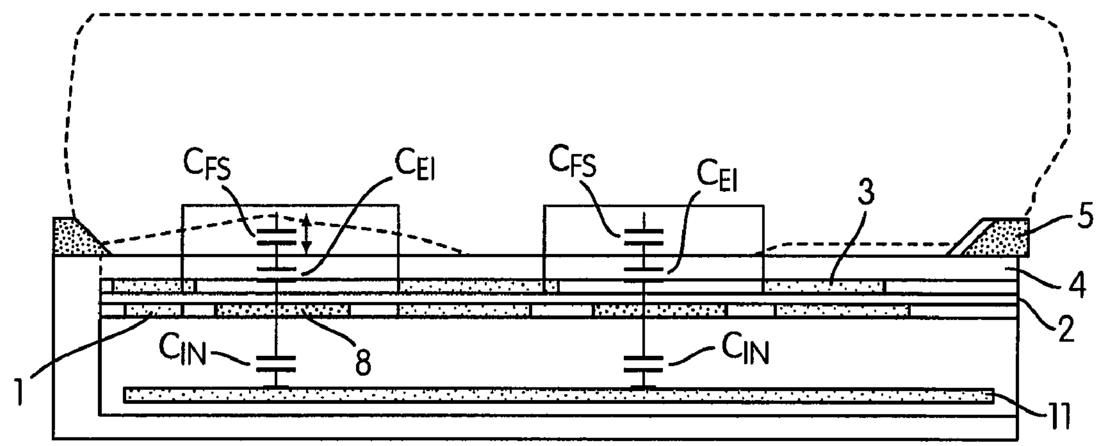
FIG. 1 shows a cross section of the layered construction of metal and dielectric layers on the upper side of the sensor (schematically).

In order to provide the necessary functionality for the capacitance based measuring principle the three or four upper metal layers on the ASIC must be used for different structures with a given electric function as for example illustrated in FIG. 1. The figure shows a possible solution is not limiting relative to other combinations of layers.

Figure 2:
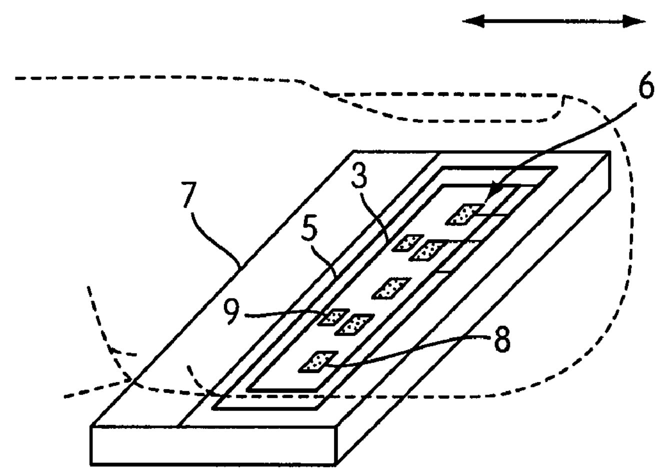
FIG. 2 shows a perspective drawing of the upper side of the sensor and of how the sensor chip may be mounted in a package (schematically).
Figure 3:
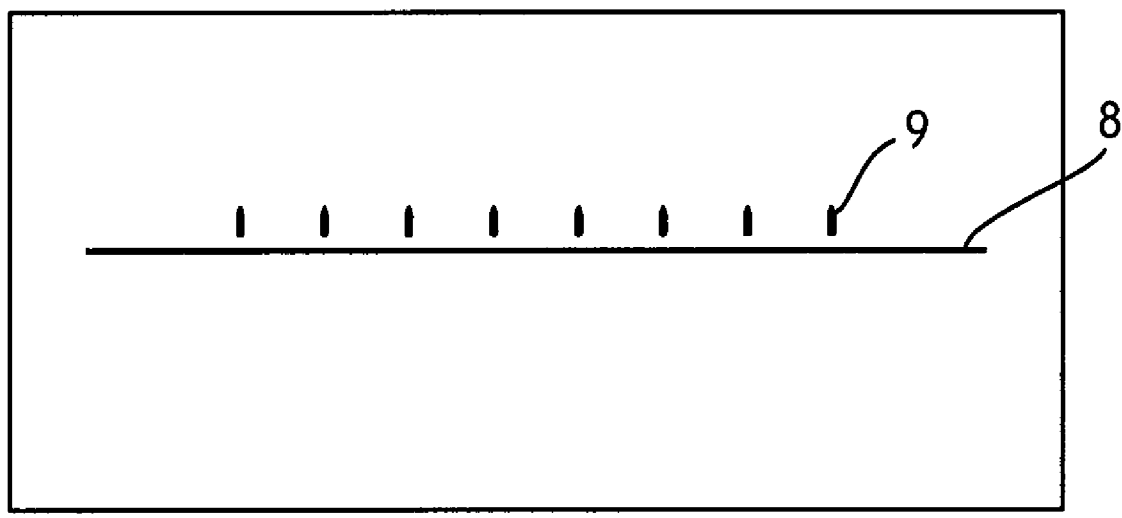
FIG. 3 shows a sketch of the sensor point distribution according to a preferred embodiment of the invention.

The layers provided on the substrate shown in FIGS. 1 and 2 show examples of the construction of the ASIC's upper layers with metal and dielectric, respectively, and will be explained below. The process for realizing the metal and dielectric layers on the silicon chip is well known technology, but the functionality of the individual layers and the combination of these is covered by the present invention, especially aimed at fingerprint sensors, as a variant of the sensor described in international patent application No. PCT/NO98/00182 which comprises an essentially linear sensor array 8, as shown in FIGS 2. and 3. FIGS. 2 and 3 also show secondary sensor groups 9 which may be used for velocity calculations, as described in the abovementioned patent. A line shaped sensor has the great advantage that it needs far less room and less individual channels than a two dimensional sensor with the same resolution, so that it may be made at a much lower cost.

In FIG. 1 the electrical layer 1 constitutes the imaging sensor elements 8. As mentioned the sensor elements may be positioned as shown in FIG. 3, as a variant of the patented solution in international patent application No PCT/NO98/00182.

The dielectric layer 2, in FIG. 1, functions as an insulation layer between the conductor leads in the electrically conductive layer 1 and the earth plane in the electrically conductive layer 3. The layer also constitutes a part of the total dielectric thickness (insulation) between the finger and the sensor element.

The electrically conductive layer 3 constitutes an earthed plane shielding the conductor leads etc. against direct coupling of AC signal from the finger and from the modulation ring 5. The earthed layer 3 will preferably be shaped so as to cover all conductor leads on the underlying first electrically conductive layer 1, but must have windows over the sensor elements 8. The openings in the earth plane 3 over the sensor elements 8 contributes with a "lens" effect to shape the electric field and thus the capacitive coupling between the finger and the sensor elements, and the shape of the sensor element 8 and the opening in the second electrically conductive layer 3 may be optimized to maximize the signal strength without going on accord with the geometric resolution of the sensor.

Alternatively the earthed shielding structure may be made using two electrically conductive layers being insulated from each other by a dielectric layer. This will provide an improved shielding and lens effect compared to the use of one layer.

The second dielectric layer 4 may insulate between the earth plane 3 and outer electrically conductive layer 5, and the second dielectric layer 4 functions as an AC coupling of the signal to the electronics. The layer 4 also constitutes (as mentioned above) a part of the total dielectric thickness (insulation) between the finger and the sensor element 8. Since the outer electrically conductive layer 5 of electrical reasons does not cover the area over the sensor elements 8 the finger will come into contact with the second dielectric layer 4. Thus, this layer must be hard and wear resistant to withstand wear and breakage, as well as chemical influences from the surrounding environment and from the user's fingers and other objects. This may be obtained using hard, impenetrable dielectrics such as $Si_3N_4$ and $SiO_2$.

The first electrically conductive layer 1 may in some cases be constituted by a coupling between a separate electronic circuit and the first dielectric layer, so that they may be produced separately. These two parts may be produced with so called flip-chip technology. In addition, the other electrically conductive layer of the chip shown in FIG. 1 comprises a lower electrically conductive layer 11 making a common earth plane for the circuit.

Figure 4:
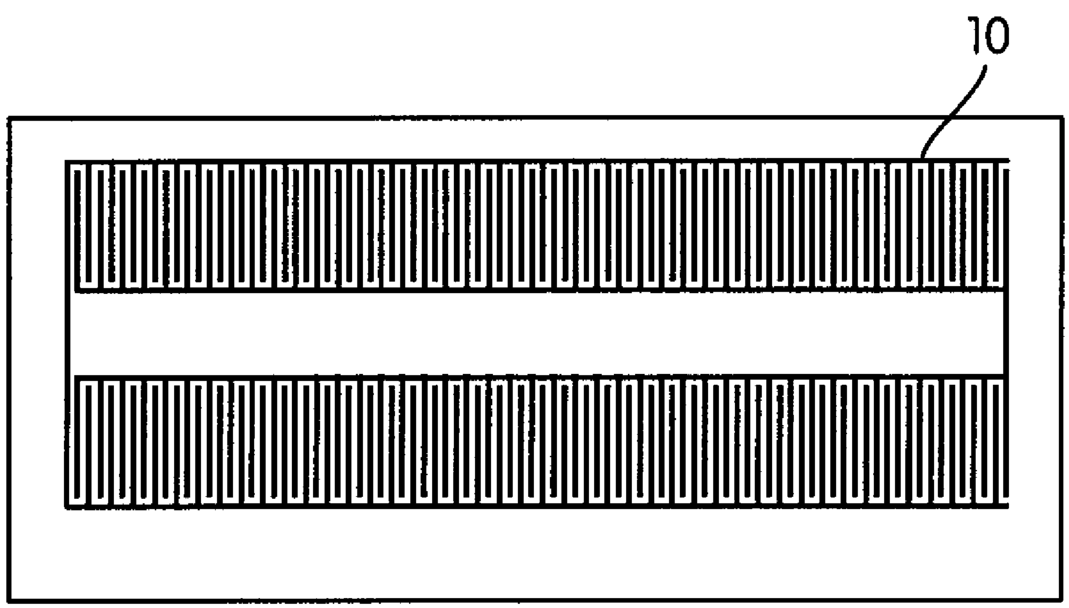
FIG. 4 shows a combined modulation electrode and activation cell for positioning on the sensor chip according to the invention.

The outer electrically conductive layer 5 is the top layer having the purpose of providing a stimulation signal, as mentioned in international patent application No. PCT/NO98/00182, into the finger for securing the signal quality, and as illustrated in FIG. 4. This therefore must be electrically conductive with good coupling to the finger. It must also be hard and wear resistant to withstand wear and breakage, as well as chemical influences from the surroundings and the user's fingers. Chrome is a possible metal for this purpose.

Preferably the outer electrical conductive layer 5 is coupled to a drive circuit for controlling frequency and amplitude of the stimulation signal.

Such an stimulation electrode may be combined with for example a capacitive activation cell being capable of detecting when a finger touches the sensor, and thus be used to control the activation of the sensor from a hibernation mode to active use, to minimize the power consumption of the sensor.

An impedance activation cell may e.g. be made as an interdigitated finger structure consisting of two not mutually interconnected "cam structures" (electrodes) 10 being shown in FIG. 4. When a conductive object, e.g. a finger, comes close to this structure the impedance between the electrodes will increase, and this change may be detected e.g. by an oscillating circuit operating with low power consumption.

If one of the electrodes is coupled to earth as long as it is in hibernation mode it will provide effective protection from ESD discharges from a finger or some other charged objects close to the sensor, as the discharge will pass directly to earth. Even if one of these electrodes is not coupled to earth the structures in the outer electrically conductive layer 10 will have an important function for ESD protection if ESD protecting circuits are coupled between the structures in this layer and earth.

An alternative method for coupling of a stimulation frequency into the finger is to cover the conductive material with a thin dielectric film so that the coupling is made purely capacitive. This may have the advantage that the coupling is more equal from person to person and being independent of the dampness of the finger.

As the characteristics of the amplifiers and other signal treatment electronics on the chip will vary from element to element, it may be of great importance to be able to calibrate the response from each sensor element. This may be obtained using a transversal electrode close to the line of sensor elements or the conductors leading to them, e.g. as part of the earthed layer 3 or another electrically conductive layer below it. By providing a calibration signal on this electrode the sensor elements will be excited capacitively without the presence of a finger or other electrically conductive object close to the sensor. Based on the resulting signals from the amplifier and signal treatment electronics it will then be possible to equalize the response from each sensor element.

The present invention consists of a device which in a unique way provides the required advantages for a solid state fingerprint sensor. Corresponding technology may also be used in other applications requiring recognition of finger movements over a surface, e.g. for navigation/mouse purposes.

The invention claimed is:

1. A sensor chip for measuring structures in a finger surface, the sensor chip comprising an array of sensor elements and a silicon chip comprising electronic circuitry, including a number of interrogation electrodes for capacitance measurements, said sensor chip further comprising:

a first electrically conductive layer including said sensor elements defining positions of sensors in the sensor chip, said sensor elements being coupled to the interrogation electrodes in the silicon chip;

a first dielectric layer substantially covering the first electrically conductive layer;

a second electrically conductive layer on the first dielectric layer, the second conductive layer including openings formed therein over the sensor elements, said second electrically conductive layer constituting an earth plane;

a second dielectric layer formed on the second electrically conductive layer; and an outer electrically conductive layer mounted on the second dielectric layer for electric coupling with structures in the finger and not covering the area over the sensor elements, wherein the silicon chip is adapted to measure the capacitance between the outer electrically conductive layer and the interrogation electrodes.

2. The sensor chip according to claim 1, wherein the first electrically conductive layer is capacitively coupled to the interrogation electrodes.

3. The sensor chip according to claim 1, wherein the outer electronically conductive layer is coupled to the silicon chip for application of a varying current or voltage to the layer.

4. The sensor chip according to claim 1, wherein the outer electrically conductive layer is coupled to a drive circuit for controlling the frequency and amplitude of a stimulation signal of the outer electrically conductive layer.

5. The sensor chip according to claim 1, wherein the second electrically conductive layer constitutes an essentially continuous layer with openings defined over the sensor electrodes in the first electrically conductive layer.

6. The sensor chip according to claim 1, wherein the thickness of the first and second dielectric layers is equal to or less than the distance between the centers of the sensor positions in the first electrically conductive layer.

7. The sensor chip according to claim 1, further comprising a lower electrically conductive layer positioned under the silicon chip.

8. The sensor chip according to claim 1, wherein the outer electrically conductive layer is adapted to have contact with the finger and is coupled to an electrical modulator in the silicon chip.

9. The sensor chip according to claim 1, wherein the outer electrically conductive layer comprises a structure for changing impedance when coming close to an electrically conductive object, and wherein the sensor further comprises circuitry adapted to cooperate with the structure for changing impedance to activate the sensor when the surface to be measured approaches.

10. The sensor chip according to claim 1, wherein the sensors form an essentially linear array.

11. The sensor chip according to claim 1, wherein said array of sensor elements is an essentially linear sensor array with a secondary sensor group for measuring finger velocity.

* * * * *